March 15, 1927.
A. GOETTING
NUT APPLYING DEVICE
Filed May 6, 1926
1,620,960
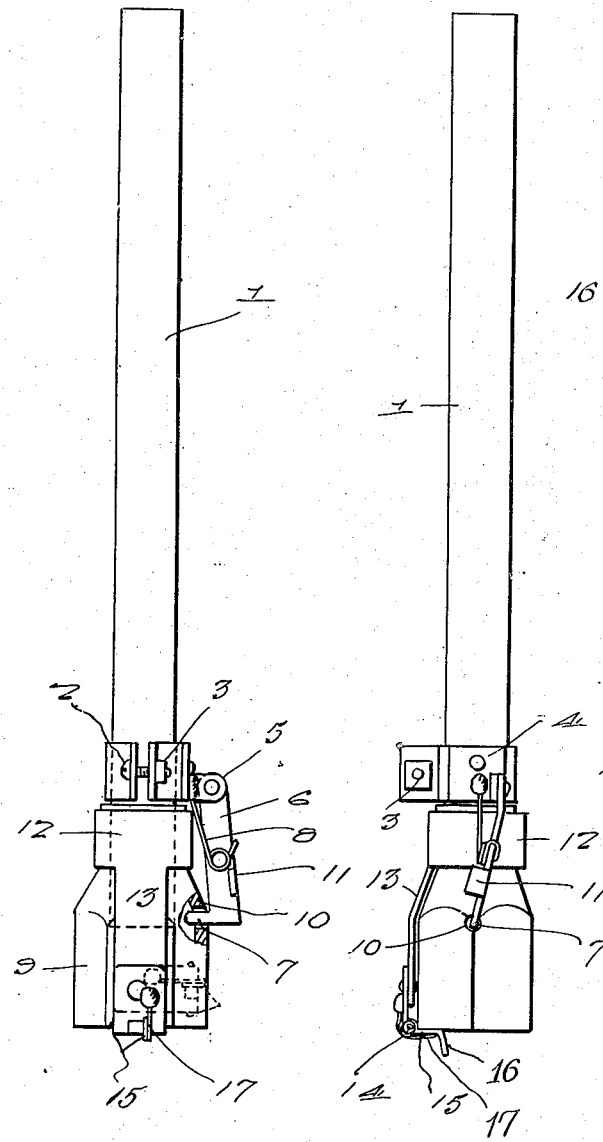
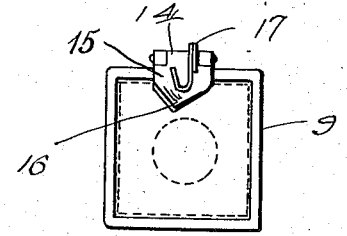
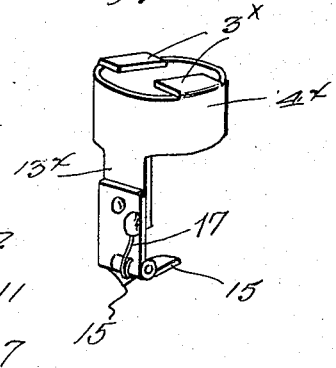
Inventor
A. Goetting
By Clarence A O'Brien
Attorney Patented Mar. 15, 1927.

1,620,960

UNITED STATES PATENT OFFICE.

ARTHUR GOETTING, OF BUCKLEY, ILLINOIS.

NUT-APPLYING DEVICE.

Application filed May 6, 1926. Serial No. 107,302.

My present invention has to do with the applying or turning of nuts into threaded engagement with complementary bolts or the like; and it contemplates the provision of a peculiar and practically advantageous nut-applying device. To the attainment of the foregoing, the invention consists in the improvement as hereinafter described and definitely claimed.

In the accompanying drawings, forming part of this specification:—

Fig. 1 is a view partly in side elevation and partly in section of a device constituting one embodiment of my invention;

Fig. 2 is an elevation taken at right angles to Fig. 1;

Fig. 3 is an end elevation taken from a viewpoint below Fig. 1, and showing a square socket member; and Fig. 4 is a perspective of a modification hereinafter explicitly referred to.

Similar numerals of reference designate corresponding parts.

I show in Figs. 1 and 2 a shank 1 which may be of angular cross-section, circular cross-section, or of any other cross-section compatible with the purpose of my invention.

Secured by a bolt 2 and nut 3 or other appropriate means on the shank 1 is a collar 4, and pivotally connected at 5 to the said collar 4 is a lever 6 having an inwardly directed toe 7 and subject to the action of a spring 8 which tends to press the toe 7 inwardly to the position shown in Fig. 1 and to yieldingly retain said toe 7 in said position.

Removably arranged on the shank 1 is a socket member 9 having an aperture 10 to receive the before-mentioned toe 7. Interiorly the socket member 9 is of any appropriate cross-section according to the configuration of the nut to be placed in the socket member; and by virtue of the construction described, it will be understood that when the lever 6 is moved outwardly by pressure applied to its lateral projection 11, the socket member 9 will be released from the shank 1 and may be replaced with a larger or smaller socket member or one having an interior of such angular cross-section as to receive and engage a nut for the turning thereof.

Mounted on the inner reduced portion of the socket member 9 is a collar 12, and extending from said collar 12 and longitudinally alongside the socket member 9 is an arm 13 to which is hingedly connected at 14 the automatic nut releaser 15 of my improvement, the said automatic releaser 15 being provided with a lip 16 and being normally maintained in the position shown in Fig. 2 by a spring 17.

It will be apparent from the foregoing that when a nut is placed in the socket member 9 the nut cannot drop out of or otherwise be displaced from the socket member 9 because the member 15 offers an obstruction to such removal or displacement of the nut from the socket member 9. When, however, the shank 1 is rotated about its axis by any appropriate means to turn the nut in the socket member 9 on a complementary bolt, it will be understood that when the lip 16, incident to the turning of the socket member 9 about its axis, engages a fish plate, or a wall or the face of any object opposed to the forward end of the socket member 9, the member 15 will be swung outwardly on its pintle and hence the nut will be permitted to move through the open end of the socket member 9, and it will also be feasible to withdrawn the socket member 9 out of engagement with the nut applied as stated, whereupon by virtue of the spring 17, the member 15 will immediately resume the relative position best shown in Figs. 2 and 3.

The socket member 9 in Figs. 1 and 2, is preferably interiorly and exteriorly of hexagonal cross-section, while the socket member 9 shown in Fig. 3 is interiorly and exteriorly of rectangular cross-section. It will be understood, however, in this connection that the cross-section of the socket member 9 both interiorly and exteriorly is of no moment, inasmuch as within the purview of my invention, the said socket member may be exteriorly of any appropriate cross-section, while it is only necessary that the interior of the socket member be of angular cross-section so that the nut in the said socket member will be turned through the medium of the socket member, which, in turn, is turned through the medium of the shank 1.

In Fig. 4, I show a modified collar $4^x$ designed to be held on a bit head or the like and having inwardly turned portions $3^x$ for keying it to a shank through the medium of which the bit head or the like is turned about its axis. The said collar $4^x$ is provided with an arm $13^x$, and the said arm $13^x$ is provided with a swingable member 15 subject to the action of a spring 17 and otherwise similar to the retaining member 15 of Figs. 1, 2 and 3.

It will be apparent from the foregoing that my improvement is possessed of a wide range of usefulness, and that my novel device is exceedingly advantageous in the placing of a nut inside of a piece of machinery, the nut being held in the socket member so that it cannot be displaced therefrom, and the nut being securely held and being strongly turned through the medium of the socket member until the retaining member 15 is moved out of the path of the nut, when the socket member may be readily withdrawn from engagement with the nut.

With particular reference to Fig. 4, it will be understood that the bit head referred to as surrounded by the collar 4ˣ is provided in its forward portion with a socket of angular cross-section designed to receive a nut so that virtually the bit head alluded to is quite as much a socket member as the socket members illustrated in Figs. 1, 2, and 3.

Notwithstanding the practical advantages of my novel device as pointed out in the foregoing, it will be noted that the device is simple and inexpensive in construction and in general is well adapted to withstand usage to which devices of corresponding character are ordinarily subjected.

I have explicitly described the preferred embodiments of my invention in order to impart an exact understanding of the said embodiments. I do not desire, however, to be understood as limiting myself to the precise construction disclosed, my invention being defined by my appended claims within the scope of which modifications may be made without departure from my invention.

Having described my invention, what I claim and desire to secure by Letters-Patent, is:—

1. In combination, a socket member adapted to receive a nut and to turn the same, and a movable nut retainer carried by said socket member; the said nut retainer being yieldingly maintained in front of the nut and in the path thereof and being shaped to be moved out of said path by contact with an object relative to which the socket member is rotated.

2. In combination, a socket member adapted to receive a nut and to turn the same, and a movable nut retainer carried by said socket member; the said retainer member being pivotally connected with the socket member and being normally maintained in yielding manner in the path of the nut, and being provided with a portion adapted on rotation of the socket member relative to an object opposed thereto to contact with said object and bring about swinging of the retainer member out of the path of the nut.

3. In combination, a socket member adapted to be turned about its axis and having an angular interior adapted to receive a nut, and a swingable spring-pressed nut retainer connected with the socket member and having a lip adapted to contact with an object in front of the socket member whereby when the socket member is turned about its axis relative to said object, the object by cooperation with said lip will swing the retainer out of the path of the nut or from a position in front of the nut.

4. In combination, a socket member having an interior of angular cross-section adapted to receive a nut and to impart turning movement to the nut, a collar mounted on the said socket member, an arm on said collar, and a spring-influenced nut retainer hingedly connected to said arm and yieldingly maintained in the path of a nut in the socket member and having a lip adapted to cooperate with an object in front of the socket member, whereby when the socket member is turned relative to said object, the nut retainer will be swung to one side and out of the path of the nut.

In testimony whereof I affix my signature.

ARTHUR GOETTING.